United States Patent
Jung et al.

(10) Patent No.: US 11,144,541 B2
(45) Date of Patent: Oct. 12, 2021

(54) INTELLIGENT CONTENT AND FORMATTING REUSE

(71) Applicant: Microsoft Technology Licensing, LLC, Redmond, WA (US)

(72) Inventors: Christopher Andrews Jung, Mercer Island, WA (US); Seth Fox, Redmond, WA (US); Erez Kikin Gil, Bellevue, WA (US); Daniel P. Costenaro, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 16/278,606

(22) Filed: Feb. 18, 2019

(65) Prior Publication Data

US 2020/0265040 A1    Aug. 20, 2020

(51) Int. Cl.
*G06F 16/9038* (2019.01)
*G06F 16/2457* (2019.01)
*G06F 16/23* (2019.01)
*G06F 16/901* (2019.01)
*G06F 3/0482* (2013.01)

(52) U.S. Cl.
CPC ........ *G06F 16/2393* (2019.01); *G06F 3/0482* (2013.01); *G06F 16/2457* (2019.01); *G06F 16/9024* (2019.01); *G06F 16/9038* (2019.01)

(58) Field of Classification Search
CPC .............................. G06F 17/00; G06F 16/2393
See application file for complete search history.

(56) References Cited

U.S. PATENT DOCUMENTS

| | | | |
|---|---|---|---|
| 2010/0153243 A1* | 6/2010 | Bird et al. | G06F 17/20 |
| 2014/0058792 A1* | 2/2014 | Talker | G06Q 30/0201 |
| 2015/0015504 A1 | 1/2015 | Lee et al. | |
| 2016/0188185 A1 | 6/2016 | Bous | |
| 2017/0126772 A1* | 5/2017 | Campbell et al. | H04L 65/608 |
| 2018/0239826 A1 | 8/2018 | Epstein et al. | |
| 2018/0293217 A1* | 10/2018 | Callaghan | G06F 17/246 |
| 2018/0341371 A1 | 11/2018 | Callaghan | |
| 2019/0007512 A1 | 1/2019 | Li | |
| 2019/0129939 A1* | 5/2019 | Hewitt et al. | G06F 17/27 |

OTHER PUBLICATIONS

"International Search Report and Written Opinion Issued in PCT Application No. PCT/US20/016901", dated May 19, 2020, 12 Pages.

* cited by examiner

*Primary Examiner* — James J Debrow
(74) *Attorney, Agent, or Firm* — Schwegman Lundberg & Woessner, P.A.

(57) ABSTRACT

A system configured intelligently reusing content and format is provided. The system receives a selection of data to be copied and an indication to copy the selected data and copies the selected data. The system receives an indication to paste the selected data at a second location. The selected data is analyzed to determine one or more options available for the paste, whereby each of the options being selectable to change an aspect of the selected data being pasted. The one or more options and an image of a placeholder representing the selected data are presented at the second location. The system receives a selection of an option from the one or more options. In response to receiving the selection of the option, the system causes presentation of the selected data in place of the image of the placeholder based on the selected option.

20 Claims, 8 Drawing Sheets

INTELLIGENT CONTENT AND FORMATTING REUSE

TECHNICAL FIELD

The subject matter disclosed herein generally relates to special-purpose machines that facilitate content copying, including computerized variants of such special-purpose machines and improvements to such variants, and to the technologies by which such special-purpose machines become improved compared to other special-purpose machines that facilitate content copying. Specifically, the present disclosure addresses systems and methods that provides intelligent content and formatting when copying content to a different location.

BACKGROUND

Typically, when a user copies data from a first location to a second location, all of the selected data is duplicated at the second location. In some cases, the format of the selected data at the first location is also duplicated. Oftentimes, however, a user just wants a portion of the data (e.g., a few columns or rows for a table). As such, the user copies all of the data and then has to manually delete the unwanted data. Further still, the user may need to reformat the data at the second location to update it (e.g., to a current time frame), to use a different visualization (e.g., from a table format to a line graph), or to use a different range of data.

BRIEF DESCRIPTION OF THE DRAWINGS

Some embodiments are illustrated by way of example and not limitation in the figures of the accompanying drawings.

DETAILED DESCRIPTION

Figure 1:
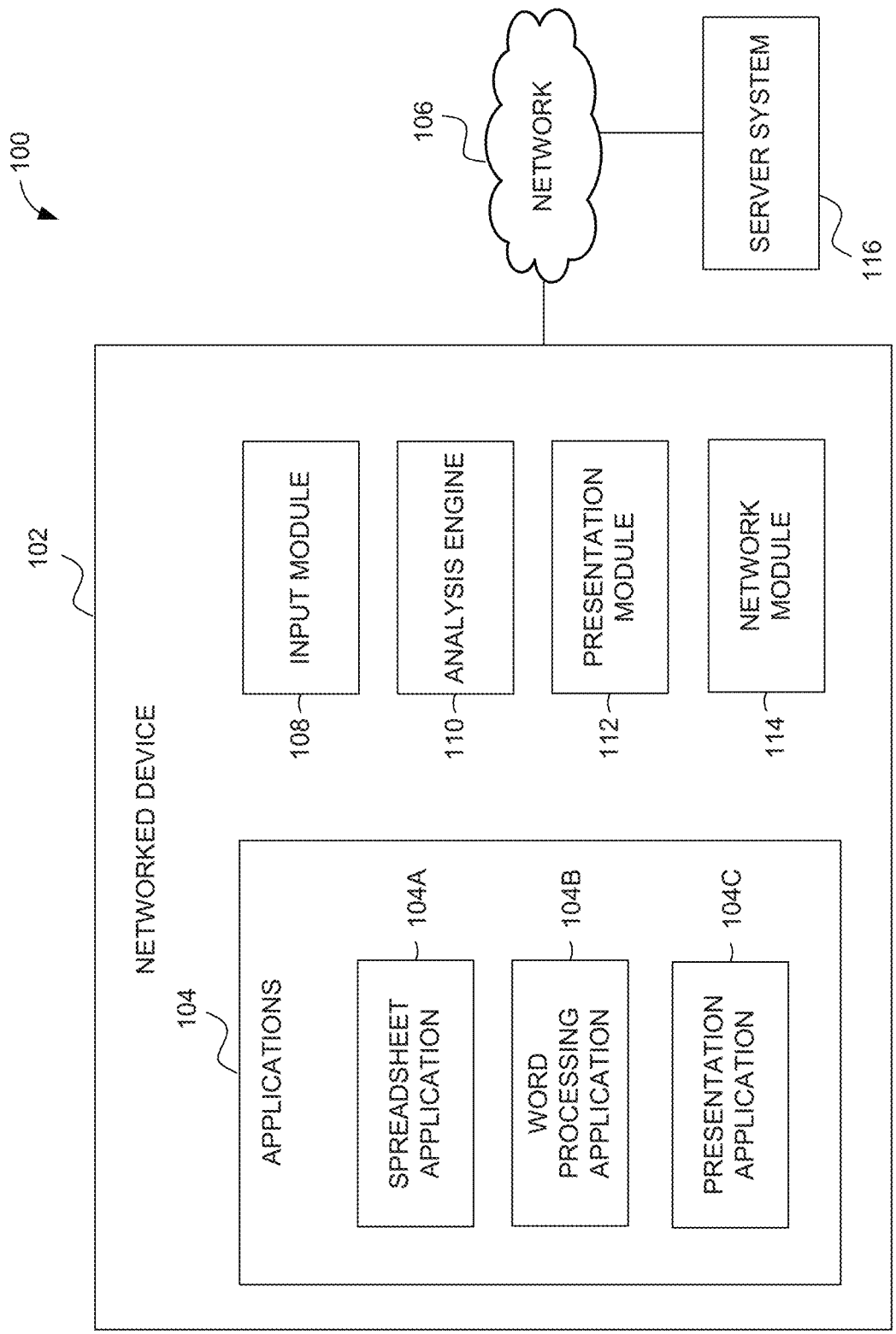
FIG. 1 is a block diagram illustrating an example environment for intelligently using content and format during a copy and paste operation, in accordance with an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) facilitate intelligently copying and pasting content and/or format of selected data. For example, when copying a table, a user can choose to keep only headings and leave the rest of the table blank, keep a format (e.g., original style of the table), or link the selected data to live data. Conventionally, many users reuse content where some of the data is useful and others not, or the users just want the formatting of the selected content (e.g., a setup of a table). Example embodiments, make it easier for these users to leverage previous content or format without having to manually delete any unwanted data or having to reformat pasted data by providing options that automatically reuses a portion of the select data, reuses one or more format/styles, or uses a new format/styles that is applicable. These embodiments have semantic knowledge (e.g., from metadata and machine-learned patterns) about the content including what are headings, rows, columns, a total row, calculated data, and so forth. In some embodiments, the system applies a layer of intelligence (e.g., machine-learning) to identify specific patterns based on history of past content/documents and copy/paste operations, in these embodiments, the system can provide recommendations of one or more options for content or format reuse or new formats.

In accordance with example embodiments, a networked system analyzes data being copied, associated metadata, and machine-learned patterns to identify different options available for a paste operation. The options can include, for example, one or more of linking the data to live information, styles associated with the selected data being copied (e.g., color, font, sizing), labels, visualizations, and ranges. As such, the options provide a mechanism for intelligently reusing (e.g., copying and pasting) format and/or content or applying a new format in an efficient and easy to use manner.

In example embodiments, a client device or a system communicatively coupled thereto (each of which, individually or collectively, also being referred to as a networked device) receives a selection of data to be copied and an indication to copy the selected data from a first location to a second location. In response, the selected data is copied whereby the selected data includes content and associated metadata. The associated metadata can include, for example, origin information of the selected content, peripheral information of the selected content (e.g., relationships with other content that may or may not be selected), style of the selected data, and type of content (e.g., text, table, image). The networked device receives an indication to paste the selected data at the second location. In response, the networked device analyzes the selected data and metadata as well as any patterns derived from past copy/paste operations by the user to determine one or more of options available, whereby each option is selectable to change an aspect of the selected data being pasted. An image of a placeholder representing the selected data is then presented at the second location along with the one or more options. In example embodiments, the options are presented relative to the image of the placeholder (e.g., as a menu to a side of the image). The user selects one of the options and the networked device presents the selected data in place of the image of the placeholder based on the selected option.

As a result, one or more of the methodologies described herein facilitate solving the technical problem of reusing a portion or a particular aspect of selected data when copying to a second location in an efficient and intelligent manner. As such, one or more of the methodologies described herein may obviate a need for certain efforts or computing resources that otherwise would be involved in copying and pasting data that needs to be further formatted (e.g., data deleted or added, styles changed, visualizations separately created). As a result, resources used by one or more machines, databases, or devices (e.g., within the environment) may be reduced by the reduction of operations needed to reformat or change copied data. Examples of such computing resources include processor cycles, network traffic, memory usage, data storage capacity, power consumption, network bandwidth, and cooling capacity.

FIG. 1 is a block diagram illustrating an example environment 100 for intelligently using content and/or a format of selected data during a copy and paste operation, in accordance with an example embodiment. In example embodiments, a networked device 102 manages copying and pasting of selected data from a first location to a second location associated with one or more applications 104. Accordingly, the networked device 102 comprises components that allow a user operating the networked device 102 to access and use the applications 104 stored thereon or communicatively coupled thereto, for example, via a network 106. The applications 104 can include a spreadsheet application 104A (e.g., Microsoft Excel), a word processing application 104B (e.g., Microsoft Word), a presentation application 104C (e.g., Microsoft PowerPoint), or any other application 104 that has functionality allowing a user to copy and paste selected data from a first location to a second location. In some instances, the first location and second location are within the same application 104. However, in other instances, the first location is in a first application and the second location is in a second application. Further still, the first location can be a networked location (e.g., a website) accessed via the network 106, while the second location is associated with one of the applications 104.

The networked device 102 also comprises components that facilitate intelligent content and format reuse in one or more of the applications 104. These components include an input module 108, an analysis engine 110, a presentation module 112, and a network module 114 all of which are configured to communicate with each other (e.g., over a bus, shared memory, or a switch) in accordance with an example embodiment.

The input module 108 is configured to receive selections and instructions from a user of the networked device 102 in order to perform the intelligent content and format reuse operations. In example embodiments, the input module 108 receives a selection of data and an indication to copy the selected data to a second location. Subsequently, the input module 108 receives an indication to paste the selected data at the second location. In some embodiments, the input module 108 also receives a selection of an option that changes an aspect of the selected data being pasted.

The analysis engine 110 analyzes the selected data and associated metadata to identify one or more applicable options that change an aspect of the selected data. Different selected data will have different options based on the content and the associated metadata of the selected data. Additionally, the analysis engine 110 machine-learns patterns for the user and uses the patterns in identifying the options. The analysis engine 110 will be discussed in more detail in connection with FIG. 2.

The presentation module 112 causes presentation of one or more options determined by the analysis engine 110 that are available for selection to change an aspect of the selected data being pasted. In some embodiments, the presentation module 112 presents an image of a placeholder that represents the selected data and the one or more options. The image of the placeholder can have a similar shape, size, or format as the selected data, but be grayed out or otherwise visually distinguished to indicate that the select data has not been pasted yet. For example, if the selected data is a table in the spreadsheet application 104A, then the image of the placeholder can be a blank table. In one instance, the blank table comprises a same number of rows and columns as the selected data but with empty cells.

In example embodiments, the presentation module 112 presents the one or more options as a menu adjacent to the image of the placeholder. Each option of the menu may have a submenu. For instance, if an option in the menu is visualization, then a submenu can include types of visualizations such as a bar graph, pie chart, scatter plot, line graph, column graph, histogram, box and whisker graph, tree map, sunburst graph, waterfall graph, funnel chart, stock graph, surface graph, radar chart, bubble graph, doughnut graph, or other visualizations that the analysis module 112 has determined are appropriate for the selected data. In some embodiments, the submenus can also have a submenu. For example, if the option is style, a first submenu can include options for color or font. Hovering a cursor over, or selection of, the color option causes a further submenu of different color options to be displayed. Similarly, a cursor over, or selection of, the font option causes a further submenu of different font options to be displayed.

In some embodiments, one of the options is a recommendation that the analysis engine 110 determines is the most likely option that the user will select based on machine learning from past selected options or paste operations for similar selected data. In these embodiments, the presentation module 112 presents the recommendation first (e.g., top of the menu). Alternatively, the presentation module 112 presents the image of the placeholder having the recommended option automatically applied. In this embodiment, the user can either accept the image of the placeholder (e.g., selecting and confirming the option) or select an alternative option (e.g., from a menu displayed adjacent to the image).

Once the input module 108 receives a final selection of an option (e.g., a bar graph option for visualization; "times roman" for font; a data range), the presentation module 112 formats the selected data according to the selection. Thus, for example, if the selection is a particular data range for selected data from a spreadsheet (e.g., first location), then the presentation module 112 displays, at the second location, a table with only the selected data within the particular data range.

In a further embodiment, more than one option can be selected. For example, the user may first select a data range for the paste operation and then selects a bar graph visualization as a second option. In this example, the presentation module 112 generates and displays a bar graph having the selected data range as the pasted data at the second location.

The networked device 102 can be coupled, via the network 106, to websites and networked systems. The network module 114 manages communications over the network 106 for the networked device 102. In one embodiment, a networked system coupled via the network 106 to the networked device 102 is a server system 116 that provides web-based services for one or more of the applications 104. In these embodiments, some of the functions performed by the components of the networked device 102 can be performed by the server system 116. For example, in a collaborative work environment, the user of the networked device 102 can use a web-based version the spreadsheet application 104A or the word processing application 104b to edit a document created by another user at a different networked device. The network module 114 provides communications with the server system 116 in order to access the functionalities provided by the server system 116.

One or more portions of the network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 106 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Any of the systems or devices shown in, or associated with, FIG. 1 may include, or otherwise be implemented in, a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the functions described herein for the networked device 102 may be subdivided with the server system 116. Additionally, any number and types of networked devices 102 may be embodied within the environment 100 of FIG. 1. Furthermore, some components or functions of the environment 100 may be combined or located elsewhere in the environment 100. For example, some of the functions of the networked device 102 may be embodied at the server system 116.

Figure 2:
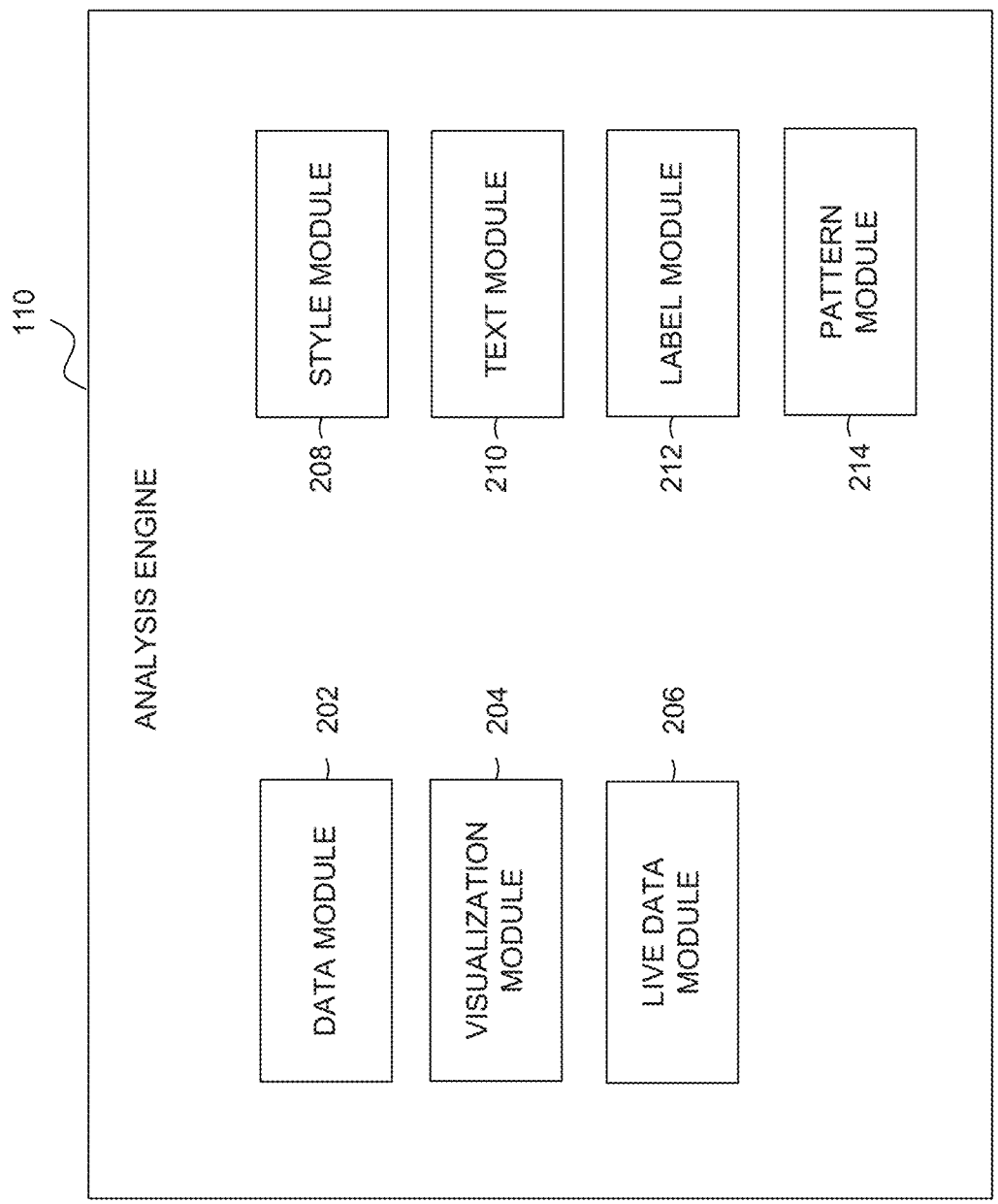
FIG. 2 is a block diagram of components of an analysis engine, in accordance with an example embodiment.

FIG. 2 is a block diagram illustrating an example embodiment of components within the analysis engine 110. In example embodiments, the analysis engine 110 performs operations to determine one or more paste options that reuse data or format for copied data. To enable these operations, the analysis engine 110 comprises a data module 202, a visualization module 204, a live data module 206, a style module 208, a text module 210, a label module 212, and a pattern module 214.

The data module 202 analyzes the selected data (e.g., content and associated metadata) to identify aspects associated with the selected data. In some embodiments, the data module 202 distinguishes between headers, columns, and rows when the selected data is part of a table. In these embodiments, the data module 202 may use the metadata to identify relationships between the data in the table. Further still, the data module 202 may have knowledge of semantics about the selected data (e.g., from the metadata). For example, a row of the selected data may comprise calculated data based on data from other rows and is shown bold. In this example, the row is metadata to be a calculated data row. If the row comprises a summation calculation (e.g., summing a plurality of data from other rows), the row can be inferred to be a total row.

The data module 202 also analyzes the selected data to determine one or more ranges applicable to the selected data. For example, the selected data may comprise data ranging from 0 to 500. In this example, the data module 202 may determine options that organize the data in one hundred increments (e.g., 0-100, 100-200, 200-300, 300-400, 400-500). These options can be presented as a submenu of a data option by the presentation module 112 and any one or more of the data range options can be selected.

The visualization module 204 analyzes the selected data (e.g., content and associated metadata) to determine if the selected data can be used to generate visualizations and determine applicable visualizations types. Visualization types include one or more of a bar graph, pie chart, scatter plot, line graph, column graph, histogram, box and whisker graph, tree map, sunburst graph, waterfall graph, funnel chart, stock graph, surface graph, radar chart, bubble graph, doughnut graph, or other graphical representation of the selected data. Options for visualization types can be presented as a sub-menu of a visualization option by the presentation module 112. In some embodiments, the visualization type can be graphically represented in the sub-menu according to its type. For example, a bar graph option is displayed as a sample bar graph, while a pie chart option is displayed as a sample pie chart.

The live data module 206 determines whether the select data can be linked to live data. For example, if the selected data is a table from a website that gets updated monthly, the live data module 206 identifies a link to the website and establishes a default time to automatically check for updates (e.g., once a month). This can be presented as a "keep live" option in an option menu by the presentation module 112. Alternatively, the live data module 206 can provide an option that allows the user to initiate a refresh that links the selected data to live data. In this embodiment, the selected data is updated in response to a user selection of the user-initiated refresh option.

The style module 208 determines style options that are applicable in the paste operation based on the content and associated metadata. In example embodiments, the style module 208 analyzes the selected data to determine current styles of the selected data and based on the current styles, suggests one or more alternate styles. Styles can include, for example, color for header, rows, or columns; color of fonts; font types; or any other aspects that affect the look of the selected data.

The text module 210 analyzes the selected data to determine whether the selected data comprises text, as opposed to a table or image, in embodiments where the selected data is text, the text module 210 can, in some cases, determine if the text is a quote that is being copied. In these cases, the text module 210 can identify different quote options that are applicable to the text. For example, if the text is a short quote, a quote option can use double quotation marks before and after the selected data. Alternatively, if the text is a long quote (e.g., more than 50 words) the quote option can be a free-standing block of the text that omits quotation marks and is indented from other content at the second location.

In some embodiments, the text module 210 can identify a topic associated with the text and use the topic to find other content (e.g., images, further text) that is related. In these embodiments, the text module 210 may identify keywords (e.g., prominent words or context) in the selected data. The keywords can be a part of a header, be bolded, or otherwise distinguished from other text. Alternatively, the keywords may be words that are used more often than other text. These keywords are then used to identify the topic. Once the topic is identified, images or further text related to the topic can be determined. The images or further text can be from a same source as the selected data (e.g., same document) or from a networked system (e.g., a website, the server system 116) accessed via the network 106. The images or further text are then provided as options by the presentation module 112.

The label module 212 analyzes the selected data and associated metadata to determine labels that are applicable to the paste operation. For example, if the selected data is from a table that includes column headers that are months, then the label module 212 can provide options for different months to be used in the paste.

In some embodiments, the label module 212 works with the pattern module 214 to determine the labels. Continuing with the example, based on the identified labels being months and based on a pattern identified by the pattern module 214 that indicates that each month the user updates the table with a current month and removes an oldest month from the pasted data, the label module 212 determines an option that includes the current month. For example, if the selected data has labels of January to March and it is now April, then the option can be a set of labels from February to April.

The pattern module 214 analyzes historical data associated with previous copy and paste operations to machine-learn and identify patterns. Accordingly, the pattern module 214 accesses historical data of previous option selections and formats used for the user. The identified patterns are based on patterns detected from the historical data, such as options usually selected or applied to pasted data in the past as well selected data or formats (e.g., size of pasted table, particular fonts) that are usually kept, deleted, selected, or applied. The patterns identified by the pattern module 214 can be used by other components of the analysis engine 110 to determine their respect options. For example, if a particular data range is typically selected, the data module 202 can identify an option that corresponds to the particular data range. Similarly, if patterns indicate particular styles (e.g., font, colors, sizes) that are commonly used, the style module 208 identifies those particular styles as options.

In some embodiments, the pattern module 214 can, based on the patterns determined for the user, select one or more options that are likely to be used in the paste option and present these options as recommendations or first in a menu or submenu. In one embodiment, the presentation module 112 presents the recommendation applied to the selected data as the image of the placeholder. The user can then select to accept the option/recommendation presented in the image or select other options that are presented. For example, if the pattern module 214 determines that a user tends to take a previous month's table and adds a new month with particular data, the pattern module 214 can infer that trend or pattern. On an initial paste of the image of the placeholder, the presentation module 112 presents the table with a new column header (for the new month) and corresponding data.

Any one or more of the components of the network environment 100 and the analysis engine 110 (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

Figure 3:
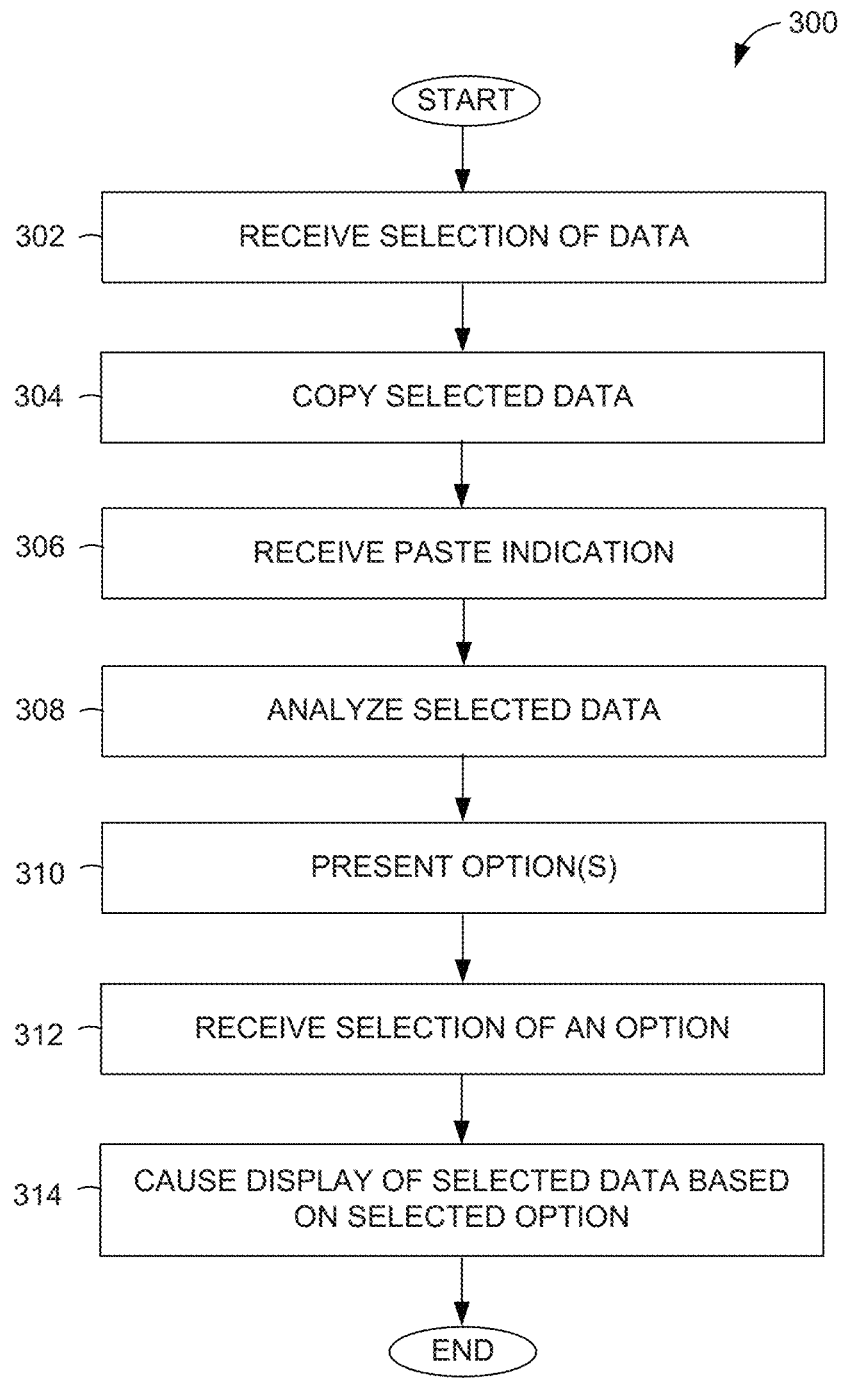
FIG. 3 is a flow diagram of an example method for intelligently reusing content and format during a copy and paste operation, accordance with an example embodiment.

FIG. 3 is a flow diagram of an example method 300 for intelligently reusing content and format during a copy and paste operation, in accordance with an example embodiment. Operations in the method 300 may be performed by the networked device 102 using components (e.g., modules, engines) described above with respect to FIG. 1 and FIG. 2. Accordingly, the method 300 is described by way of example with reference to the networked device 102. However, it shall be appreciated that at least some of the operations of the method 300 may be deployed on various other hardware configurations or be performed by similar components residing elsewhere. For example, some of the operations may be performed at the server system 116.

In operation 302, the input module 102 receives a selection of data to be copied and an indication to copy the selected data. In example embodiments, the selected data is from a first location. The user may select the data by, for example, pointing to it, highlighting it, or creating a bounding box around the data. The user may then trigger a copy operation by providing an indication to copy the selected data (e.g., right clicking to bring up a menu and selecting a copy option on the menu).

In operation 304, the selected data is copied (e.g., by the input module 108 or another component of the networked device 102). In some embodiments, the selected data (or a version of the selected data) is copied to a clipboard. In other embodiments, reference information (to access the selected data at a first location of a source document) is copied to the clipboard instead of the selected data. In some cases, content on the clipboard includes metadata associated with the selected data (e.g., table properties, relationships between selected and/or non-selected data).

In operation 306, a paste indication is received by the input module 102 at a second location. The second location can be on a same document or a different document and can be within the same application 104 or a different application. Further still, the first location of the source of the selected data can be a network-based system couple via the network 106 to the networked device 102.

In operation 308, the selected data is analyzed to identify one or more options for reusing content or a format of the selected data. Operation 308 will be discussed in more detail in connection with FIG. 5 below. In some embodiments, operation 308 may occur prior to operation 306. For instance, operation 308 can occur as soon as the selected data is copied (in operation 304).

In operation 310, one or more options to change an aspect of the selected data at paste are presented by the presentation module 112. In some embodiments, the presentation module 112 presents an image of a placeholder that represents the selected data and the one or more options. The one or more options is presented as a menu adjacent to the image of the placeholder in accordance with one embodiment. Furthermore, each option of the menu can have a submenu.

In some embodiments, an option that the analysis engine 110 determines is the most likely option based on machine learning from past selected options or paste operations for similar selected data is recommended. In some cases, the recommendation may be presented first in the menu.

In operation 312, the input module 102 receives a selection of a presented option. The selection is a selection of an option from the menu or submenu presented by the presentation module 112.

In operation 314, the selected data is displayed (e.g., content is pasted) based on the selected option, in example embodiments, the presentation module 112 formats the selected data according to the selected option. Thus, for example, if the selection is a particular data range for selected data from a spreadsheet (e.g., first location), then the presentation module 112 displays, at the second location, a table with only the selected data within the particular data range. In some embodiments, more than one option can be selected and the presentation module 112 pastes the selected data based on all of the selected options.

Figure 4:
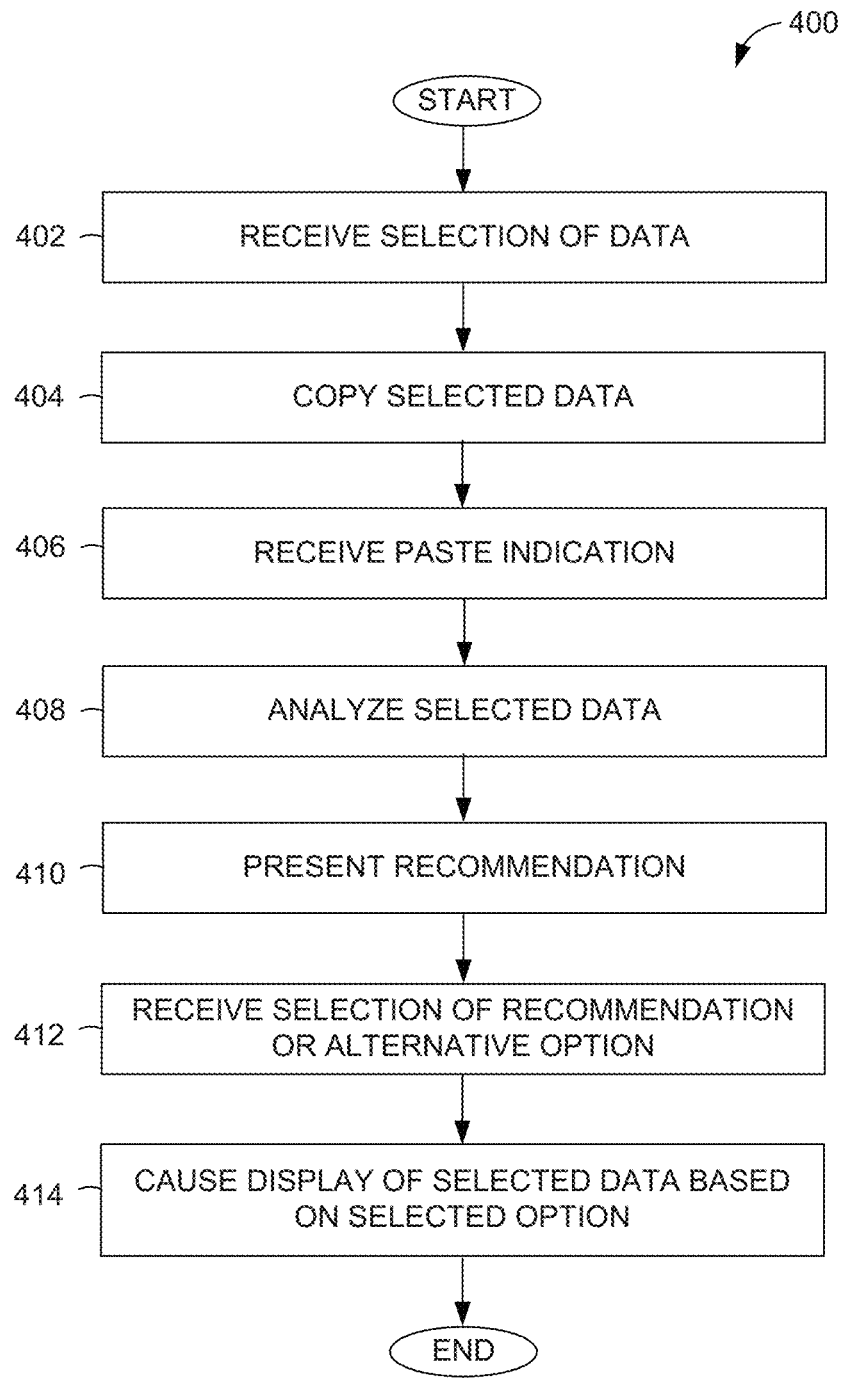
FIG. 4 is a flow diagram of an alternative example method for intelligently reusing content and format during a copy and paste operation, in accordance with an example embodiment.

FIG. 4 a flow diagram of an example method 400 for intelligently reusing content and format during a copy and paste operation, in accordance with an alternative example embodiment. Operations in the method 400 may be performed by the networked device 102 using components (e.g., modules, engines) described above with respect to FIG. 1 and FIG. 2. Accordingly, the method 400 is described by way of example with reference to the networked device 102. However, it shall be appreciated that at least some of the operations of the method 400 may be deployed on various other hardware configurations or be performed by similar components residing elsewhere. For example, some of the operations may be performed at the server system 116.

Operations 402 through 408 are the same as operations 302 through 308 of FIG. 3.

In operation 410, one or more options determined by the analysis engine 110 (e.g., the pattern module 214) to be mostly likely to be used in the paste operation is presented as a recommendation automatically applied to the selected data by the presentation module 112. In these embodiments, the image may be shown visually distinguished (e.g., lighter color, semi-opaque, grayed out) to indicate that the image is a placeholder.

In operation 412, the input module 102 either receives a selection confirming the automatically applied option(s) or a selection of an alternative option. The selection of the alternative option is from the menu or submenu presented relative to (e.g., adjacent) the image having the recommendation automatically applied.

In operation 414, the presentation module 112 displays (e.g., pastes) the selected data at the second location based on the selected option. If the selection option is the confirmation of the automatically applied option(s), the presentation module 112, in embodiments where the image of the placeholder is shown visually distinguished, changes the appearance of the image of the placeholder such that it is no longer visually distinguished. For example, the pasted content (e.g., corresponding to the image of the placeholder) is made a darker color (from a lighter color), made solid (from semi-opaque, or the graying out removed.

Figure 5:
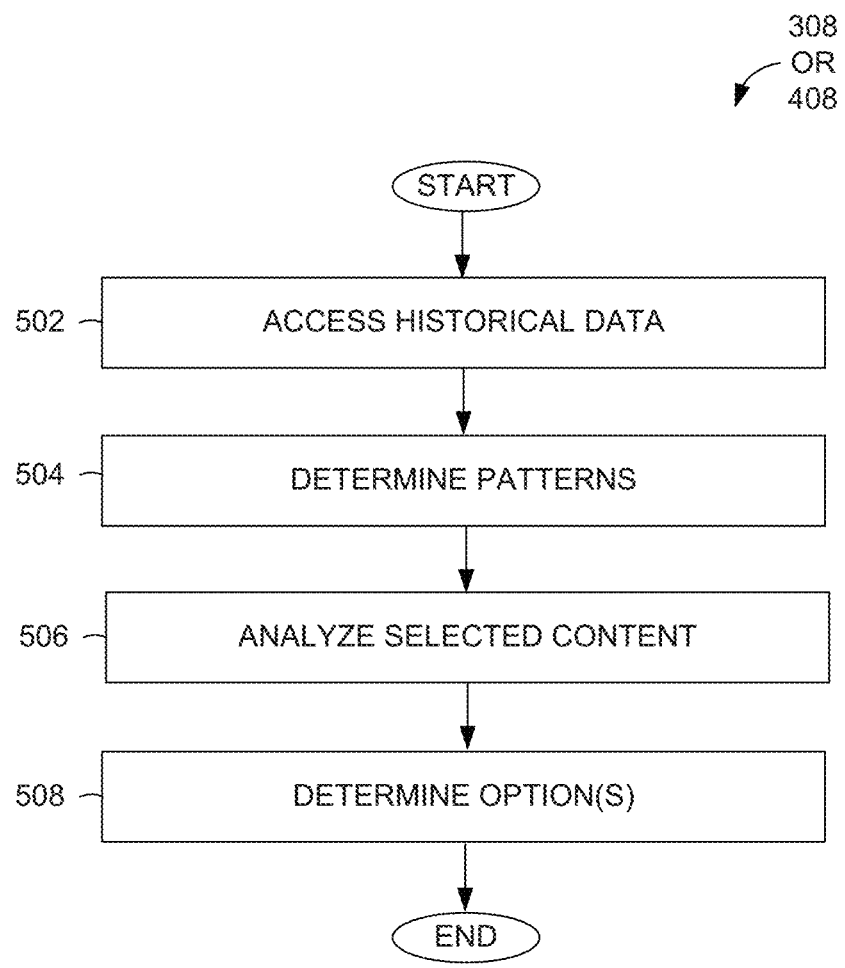
FIG. 5 is a flow diagram of an example method for analyzing the selected data, in accordance with an example embodiment

FIG. 5 is a flow diagram of an example method 500 for analyzing the selected data, in accordance with example embodiments. Operations in the method 500 may be performed by the networked device 102, using components (e.g., modules, engines) described above with respect to FIG. 1 and FIG. 2. Accordingly, the method 500 is described by way of example with reference to the networked device 102. However, it shall be appreciated that at least some of the operations of the method 500 may be deployed on various other hardware configurations or be performed by similar components residing elsewhere. For example, some of the operations may be performed at the server system 116.

In operation 502, historical data is accessed by the pattern module 214. The historical data can include previous patterns identified by the pattern module 214 as well as previous selections of options and generally used formats and content.

In operation 504, patterns are determined (or updated based on more recent historical data). The pattern module 214 analyzes the historical data associated with previous copy and paste operations to machine-learn and identify patterns. As such, the identified patterns are based on past user behaviors identified from the historical data, such as options typically selected or applied to pasted data as well as typically selected data or formats (e.g., size of pasted table, particular fonts) that are usually kept, deleted, selected, or applied. The patterns identified by the pattern module 214 can be used by other components of the analysis engine 110 (in operation 506) to determine their respect options.

In some embodiments, operations 502 and 504 are performed prior to a current copy/paste operation (e.g., in background). In these embodiments, the pattern module 214 accesses the prior determined patterns during runtime when the copy/paste operation is received.

In operation 506, the selected content is analyzed. Various modules of the analysis engine 110 analyzes the selected content (e.g., the selected data along with associated metadata), sometimes in conjunction with the pattern module 214 or with other modules of the analysis engine. As such any combination of the modules of the analysis engine 110 can be used to determine the options.

In some embodiments, the data module 202 analyzes the selected data (e.g., content and associated metadata) to identify aspects associated with the selected data such as headers, columns, and rows when the selected data is part of a table or spreadsheet and to identify relationships between the data in the table (with both selected and non-selected data in the table). Further still, the data module 202 may have knowledge of semantics about the selected data (e.g., from the metadata). As such, the data module 202 uses content copied to a clipboard to determine options. The content can indicate type of object (e.g., text, table, image) and types of operations the data supports, identify semantic meaning (e.g., via application 104 communication or content parsing), and indicate surrounding document context (for both source and destination).

Similarly, the label module 212 analyzes the selected data and associated metadata to determine labels (e.g., of headers) that are applicable to the paste operation. For example, if the selected data is from a table that includes column headers that are months, then the label module 212 can provide options for different months to be used in the paste. In some embodiments, the label module 212 works with the data module 202 and the pattern module 214 to determine options. For example, the pattern module 214 observes user behavior over time or by understanding header names (e.g., identified by the data module 202) to determine that the content is associated with a monthly report where a current month's data is always used as last month's data for a next report with the same formatting. Based on this analysis, any one or more of the data module 202, label module 212, or pattern module 214 identifies an option that offers a correct table on paste (e.g., clearing out cells, retaining formatting, and retaining one or more columns of information).

In another example, the data module 202 understands through table properties identified from the metadata that the table contains a heading row, columns, and a total row. Based on patterns detected by that pattern module 214 that the user typically reuses only the formatting of the table, the data module 202 or pattern module 214 determines an option that keeps the formatting (e.g., the heading row, column, and total row) on paste while removing the content from other cells of the table.

Further still, the visualization module 204 analyzes the selected data and associated metadata to determine if the selected data can be used to generate visualizations and determine applicable visualizations types. Patterns determined by the pattern module 214 can identify particular visualizations that are typically used by the user. In further cases, the data module 202 determines a type of table or content that is being copied and the pattern module 214 determines patterns of visualizations typically selected for that type of table or content. Options for visualization types can be then be presented based on this analysis.

The live data module 206 determines whether the select data can be linked to live data. In a further embodiment, the data module 202 determines a type of table or content that is being copied and the pattern module 214 determines whether that type of table or content is typically linked to live data. One or more live link options can then be provided based on this analysis (e.g., keep live option, user-initiated update option, keep static option).

The style module 208 determines style options that are applicable in the paste operation based on the selected data. In example embodiments, the style module 208 analyzes the selected data to determine current styles of the selected data and based on the current styles, suggests one or more alternate styles. Styles can include, for example, color for headers, rows, or columns; color of fonts; font types; or any other aspects that affect the look of the selected data. Additionally, patterns determined by the pattern module 214 can identify particular styles that are typically used by the user. Thus, by combining the patterns and the detected styles, style options that are most relevant to the user can be provided.

The text module 210 analyzes the selected data to determine whether the selected data comprises text, as opposed to a table or image. In embodiments where the selected data is text, the text module 210 can determine if the text is a quote that is being copied and provide quote options on paste. In some embodiments, the text module 210 can identify a topic associated with the text and use the topic to find other content (e.g., images, further text) that is related.

In operation 508, one or more options are determined for presentation to the user. The options are based on the analyzed content, the determined patterns, or a combination of both. In some embodiments, options that the user is most likely to selected are identified as the options to be presented or are prioritized on the menu. In some embodiments, a recommendation comprising one or more options that the user is most likely to be selected is determined and, in some cases, automatically applied to the image of the placeholder.

Figure 6A:
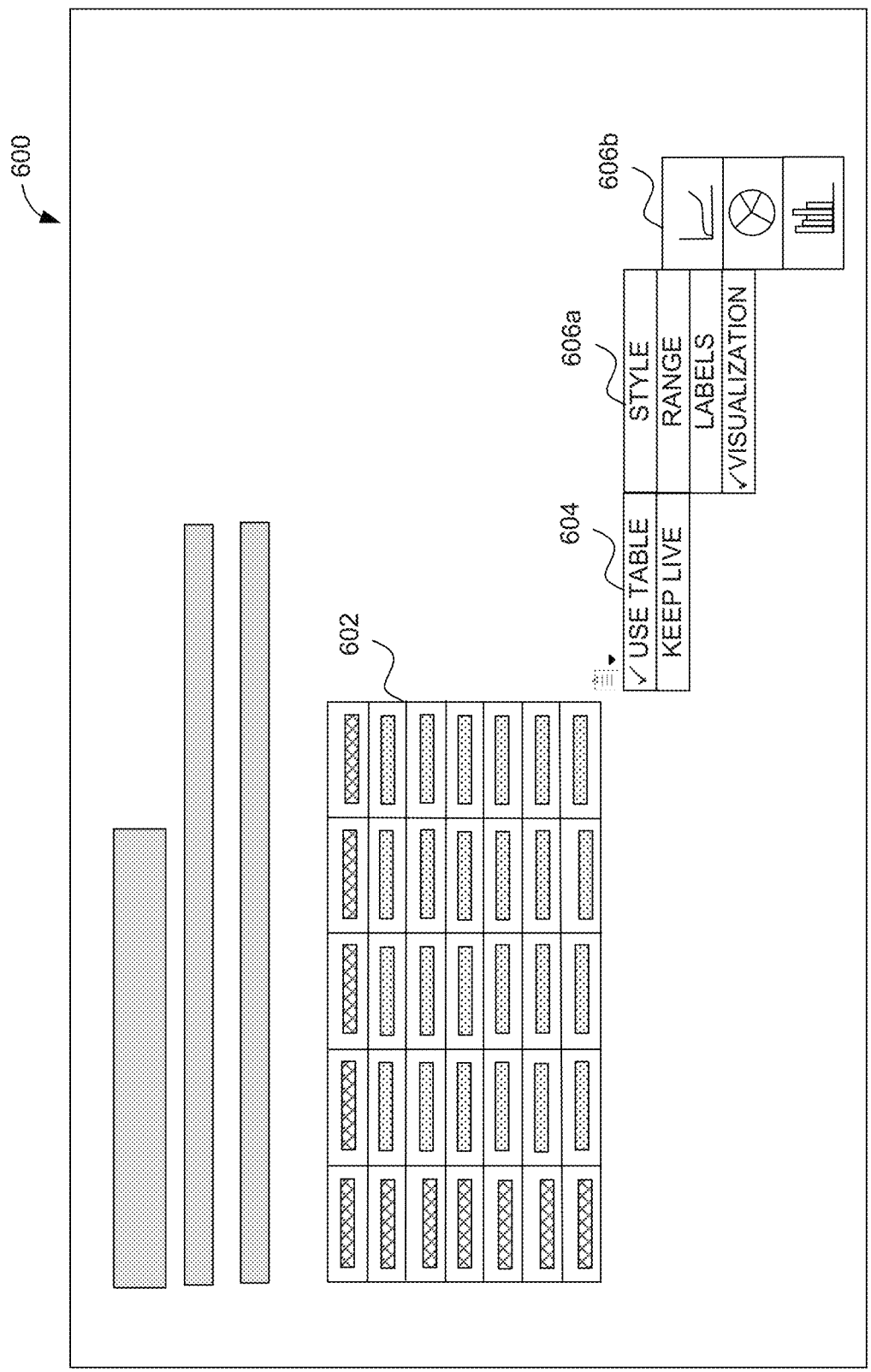
FIG. 6A is a screenshot of an example user interface for providing options.

FIG. 6A illustrates an example screenshot of an example user interface 600 for providing options for a paste operation at a second location. In one embodiment, the user interface 600 provides an image 602 of a placeholder for the paste operation. The image 602 may have a similar appearance as the selected data from the first location. For example, if the selected data to be copied and pasted is a table, an image of a table is presented. Similarly, if the selected data to be copied and pasted is text, an image of text is presented. The image 602 can have blank or dummy data. Alternatively, the image 602 can comprise a paste of the selected data with recommended option(s) automatically applied. In this embodiment, the user can select to approve the automatically pasted content or select alternative options.

One or more options (or alternative options for the automatically applied embodiment) are presented in a menu 604 and submenus 606*a* and 606*b* (all collectively referred to as "menus"). The menu 604 and submenus 606 shown are merely examples and alternative embodiments can comprise other options, less options, or more option in the menus based on the options determined to be applicable for each alternative embodiment. The menus can also be combined. For example, the menu 604 and the sub-menu 606*a* can be incorporated into a single menu. Further still, the menus can display options in a different order or format. Additionally, other graphical elements (e.g., not menus) can be used to illustrate options for selection.

In the example of FIG. 6A, the menu 604 provides options to keep the pasted data live (e.g., "keep live" option) or to use static content from the first location (e.g., "use table" option). In a further embodiment, an option that allows the user to manually initiate a refresh that links the selected data to live data can be provided. In this embodiment, the selected data is updated in response to a user selection of the user-initiated refresh option.

The sub-menu 606*a* presents options to customize the appearance of the selected data upon paste at the second location. In the example of FIG. 6A, the options identified to be applicable to the selected data include a style option, a labels option, a visualization option, and a range option. Each of the options in the submenu 606*a* can have further options. For example, the user has selected the visualization option in the submenu 606*a*. In response, the presentation module 112 presents a submenu 606*b* that provides different visualization options applicable to the selected data. In this example, the visualization options are illustrated graphically. However, an alternative embodiment can present the visualization options textually.

Figure 6B:
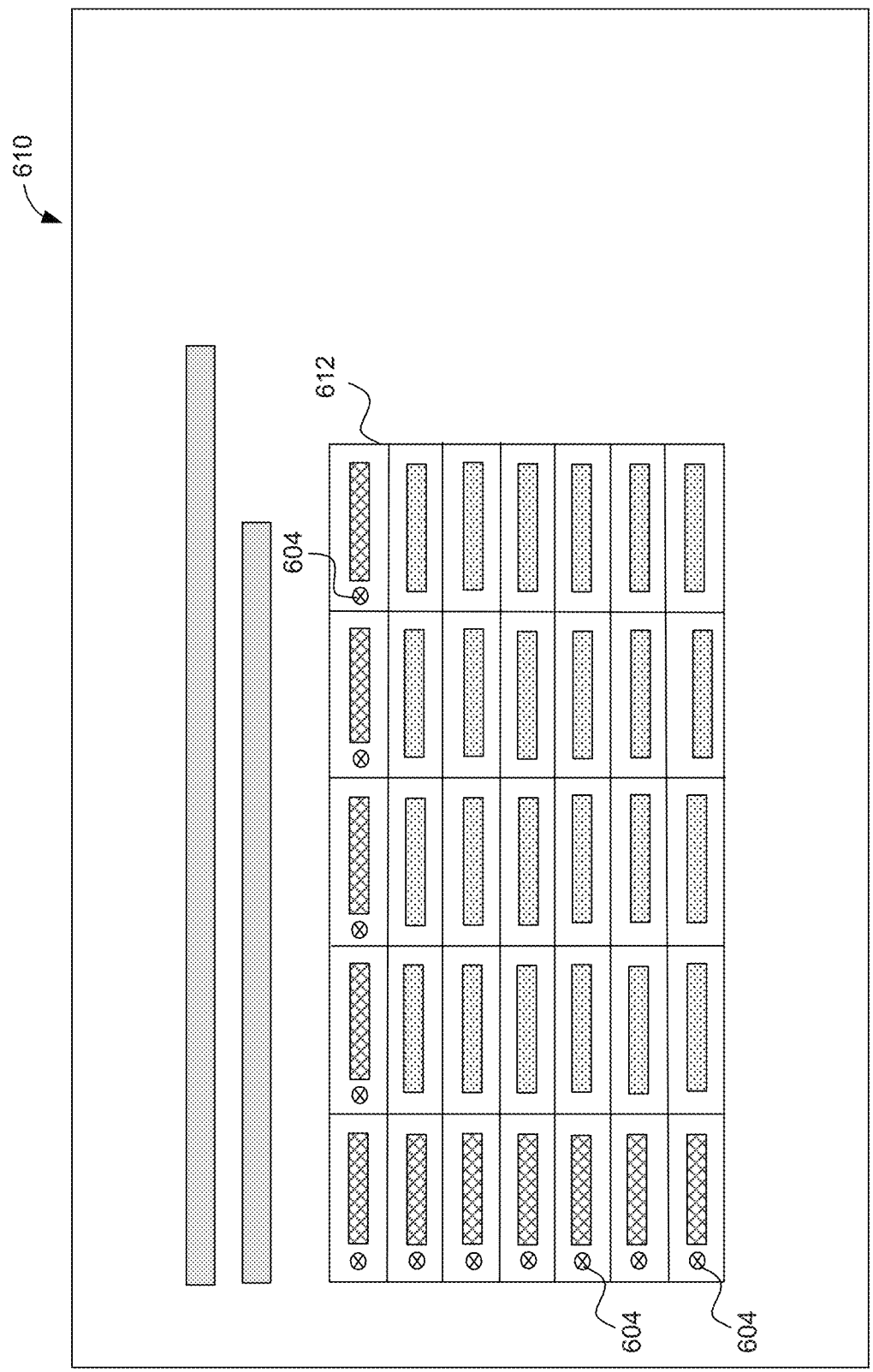
FIG. 6B is a screenshot of a different example user interface in which the user can delete rows and columns but maintain a format.

FIG. 6B is a screenshot of a different example user interface 610 in which the user can delete rows and columns of a paste of a table but maintain the formatting. In this embodiment, the presentation module 112 pastes a table 612 comprising the selected data in a recommended format (e.g., automatically applies options determined from the patterns). However, the user may not want all of the rows or columns of data that are pasted. As such, delete icons are presented for each of the rows and columns that allows the user to easily delete unwanted data.

Figure 7:
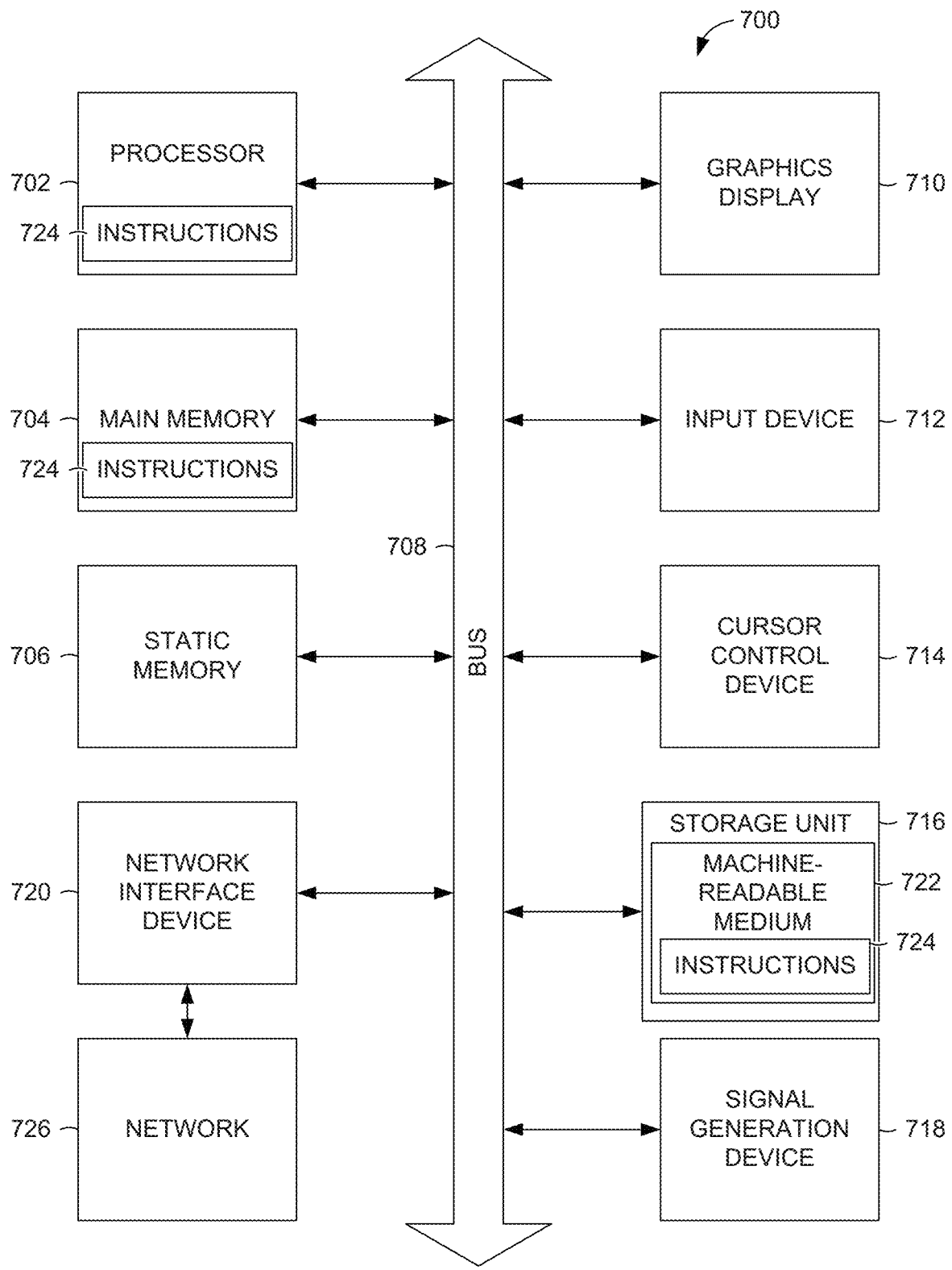
FIG. 7 is a diagrammatic representation of a machine in an example form of a computing system within which a set of instructions may be executed for causing the machine to perform any one or more of the methodologies discussed herein, according to an example embodiment.

FIG. 7 is a block diagram illustrating components of a machine 700, according to some example embodiments, able to read instructions 724 from a machine-storage medium 722 and perform any one or more of the methodologies discussed herein, in whole or in part. Specifically, FIG. 7 shows the machine 700 in the example form of a computer device (e.g., a computer) within which the instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flows and flow diagrams of FIGS. 3 to 5. The instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. The machine 700 may be a server computer, a client computer, a personal computer (PC), a tablet computer, a laptop computer, a netbook, a set-top box (e.g. SIB), a personal digital assistant (PDA), a cellular telephone, a smartphone, a web appliance, a network router, a network switch, a network bridge, a power adapter, or any machine 700 capable of executing the instructions 724, sequentially or otherwise, that specify actions to be taken by that machine 700. Further, while only a single machine 700 is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, a signal generation device 718 (e.g., a sound card, an amplifier, a speaker, a headphone jack, or any suitable combination thereof), and a network interface device 720.

The storage unit 716 includes the machine-storage medium 722 on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-storage media 722. (e.g., tangible and non-transitory machine-readable media).

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by process(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below. In this sense, a machine storage medium is non-transitory.

Signal Medium

The term "signal medium" or "transmission medium" shall be taken to include any form of modulated data signal, carrier wave, and so forth. The term "modulated data signal"

means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., LTE, and WiMAX networks). The term "transmission medium" or "signal medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 722 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 702 or a group of processors 702) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a method for intelligently reusing content and format in a paste operation. The method comprises receiving a selection of data to be copied and an indication to copy the selected data; copying the selected data, the selected data including content and associated metadata; receiving an indication to paste the selected data at a second location; analyzing, by a hardware processor, the selected data to determine one or more options available for the paste, each of the options being selectable to change an aspect of the selected data being pasted; causing presentation, at the second location, of the one or more options and an image of a placeholder representing the selected data, the one or more options being presented relative to the image of the placeholder; receiving a selection of an option from the one or more options; and in response to receiving the selection of the option, causing presentation of the selected data in place of the image of the placeholder based on the selected option.

In example 2, the subject matter of example 1 can optionally include wherein the selected option comprises an automatic live data link option that links the selected data to live data, the selected data being automatically updated in response to a change in the live data.

In example 3, the subject matter of examples 1-2 can optionally include wherein the selected option comprises a user-initiated refresh option that links the selected data to live data, the selected data being updated in response to a user selection of the user-initiated refresh option.

In example 4, the subject matter of examples 1-3 can optionally include wherein the analyzing the selected data to determine the plurality of options comprises determining one or more visualizations applicable to the selected data; the causing the plurality of options to be presented comprises providing a graphical representation of each of the visualizations applicable to the selected data; the receiving the selection of the option comprises receiving a selection of a visualization; and the causing presentation of the selected data in place of the image of the placeholder based on the selected option comprises presenting the selected data in a format of the selected visualization.

In example 5, the subject matter of examples 1-4 can optionally include wherein the visualization comprises a bar graph, pie chart, scatter plot, line graph, column graph, histogram, box and whisker graph, tree map, sunburst graph, waterfall graph, funnel chart, stock graph, surface graph, radar chart, bubble graph, or doughnut graph.

In example 6, the subject matter of examples 1-5 can optionally include wherein the analyzing the selected data to determine the plurality of options comprises determining one or more ranges applicable to the selected data; the receiving the selection of the option comprises receiving a selection of a range of the one or more ranges; and the causing presentation of the selected data in place of the image of the placeholder based on the selected option comprises presenting the selected data within the selected range.

In example 7, the subject matter of examples 1-6 can optionally include wherein the analyzing the selected data to determine the plurality of options comprises determining different styles applicable to the selected data; the receiving the selection of the option comprises receiving a selection of a style option corresponding to one of the styles; and the causing presentation of the selected data in place of the image of the placeholder data based on the selected option comprises presenting the selected data having a style and format indicated by the selected style option.

In example 8, the subject matter of examples 1-7 can optionally include detecting, from historical data of past copy and paste operations, patterns of options previously selected, wherein the analyzing the selected data to determine a plurality of options comprises identifying an option based on the patterns.

In example 9, the subject matter of examples 1-8 can optionally include wherein the option based on the patterns is a recommendation that is automatically applied to the image of the placeholder.

In example 10, the subject matter of examples 1-9 can optionally include wherein the analyzing the selected data to determine the plurality of options comprises determining a label, based on historical data of past copy and paste operations, applicable to the selected data; the receiving the selection of the option comprises receiving a selection of the label; and the causing presentation of the selected data in place of the image of the placeholder based on the selected option comprises presenting the selected data having the selected label.

In example 11, the subject matter of examples 1-10 can optionally include wherein the analyzing the selected data to determine a plurality of options comprises distinguishing between headers, columns, and rows of the selected data, the selected data comprising a table; the causing presentation of the image of placeholder representing the selected data and the plurality of options comprises causing presentation of the table with delete icons associated with each row and column of the table, a selection of one of the delete icons causing a corresponding row or column to be deleted; the receiving the selection of the option comprises receiving a selection of a delete icon for one of the rows or columns; and the causing presentation of the selected data in place of the image of the placeholder based on the selected option comprises maintaining a style and format of the table with a corresponding row or column, based on the selection of the delete icon, deleted.

In example 12, the subject matter of examples 1-11 can optionally include wherein the selected data comprises text regarding a topic and the plurality of options comprises images associated with the topic.

In example 13, the subject matter of examples 1-12 can optionally include wherein the selected data comprises text and one of the plurality of options comprises a quote option to place the selected data into a quote format.

Example 14 is a system for intelligently reusing content and format in a paste operation. The system includes one or more processors and a storage medium storing instructions that, when executed by the one or more hardware processors, causes the one or more hardware processors to perform operations comprising receiving a selection of data to be copied and an indication to copy the selected data; copying the selected data, the selected data including content and associated metadata; receiving an indication to paste the selected data at a second location; analyzing the selected data to determine one or more options available for the paste, each of the options being selectable to change an aspect of the selected data being pasted; causing presentation, at the second location, of the one or more options and an image of a placeholder representing the selected data, the one or more options being presented relative to the image of the placeholder; receiving a selection of an option from the one or more options; and in response to receiving the selection of the option, causing presentation of the selected data in place of the image of the placeholder based on the selected option.

In example 15, the subject matter of example 14 can optionally include wherein the analyzing the selected data to determine the plurality of options comprises determining one or more visualizations applicable to the selected data; the causing the plurality of options to be presented comprises providing a graphical representation of each of the visualizations applicable to the selected data; the receiving the selection of the option comprises receiving a selection of a visualization; and the causing presentation of the selected data in place of the image of the placeholder based on the selected option comprises presenting the selected data in a format of the selected visualization.

In example 16, the subject matter of examples 14-15 can optionally include wherein the analyzing the selected data to determine the plurality of options comprises determining one or more ranges applicable to the selected data; the receiving the selection of the option comprises receiving a selection of a range of the one or more ranges; and the causing presentation of the selected data in place of the image of the placeholder based on the selected option comprises presenting the selected data within the selected range.

In example 17, the subject matter of examples 14-16 can optionally include wherein the analyzing the selected data to determine the plurality of options comprises determining different styles applicable to the selected data; the receiving the selection of the option comprises receiving a selection of a style option corresponding to one of the styles; and the causing presentation of the selected data in place of the image of the placeholder data based on the selected option comprises presenting the selected data having a style and format indicated by the selected style option.

In example 18, the subject matter of examples 14-17 can optionally include wherein the operations further comprise detecting, from historical data of past copy and paste operations, patterns of options previously selected, wherein the analyzing the selected data to determine a plurality of options comprises identifying an option based on the patterns.

In example 19, the subject matter of examples 14-18 can optionally include wherein the option based on the patterns is a recommendation that is automatically applied to the image of the placeholder.

Example 20 is a machine-storage medium for intelligently reusing content and format in a paste operation. The machine-storage medium configures one or more processors to perform operations comprising receiving a selection of data to be copied and an indication to copy the selected data; copying the selected data, the selected data including content and associated metadata; receiving an indication to paste the selected data at a second location; analyzing the selected data to determine one or more options available for the paste, each of the options being selectable to change an aspect of the selected data being pasted; causing presentation, at the second location, of the one or more options and an image of a placeholder representing the selected data, the one or more options being presented relative to the image of the placeholder; receiving a selection of an option from the one or more options; and in response to receiving the selection of the option, causing presentation of the selected data in place of the image of the placeholder based on the selected option.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving a selection of data to be copied and an indication to copy the selected data;
copying the selected data, the selected data including content and associated metadata;
receiving an indication to paste the selected data at a second location;
prior to pasting at the second location, analyzing, by a hardware processor, the selected data to determine one or more options available for the paste, each of the options being selectable to change an aspect of the selected data at paste;
prior to pasting at the second location, causing presentation, at the second location, of the one or more options and an image of a placeholder representing the selected data, the image of the placeholder having a similar shape, size, or format as the selected data from the first location, the one or more options being presented relative to the image of the placeholder;
receiving a selection of an option from the one or more options; and
in response to receiving the selection of the option, pasting the selected data at the second location by causing presentation of the selected data, formatted according to the selected option, in place of the image of the placeholder.

2. The method of claim 1, wherein the selected option comprises an automatic live data link option that links the selected data to live data, the selected data being automatically updated in response to a change in the live data.

3. The method of claim 1, wherein the selected option comprises a user-initiated refresh option that links the selected data to live data, the selected data being updated in response to a user selection of the user-initiated refresh option.

4. The method of claim 1, wherein:
the analyzing the selected data to determine the one or more of options comprises determining one or more visualizations applicable to the selected data;
the causing the one or more options to be presented comprises providing a graphical representation of each of the visualizations applicable to the selected data;
the receiving the selection of the option comprises receiving a selection of a visualization; and
the causing presentation of the selected data in place of the image of the placeholder comprises presenting the selected data in a format of the selected visualization.

5. The method of claim 4, wherein the visualization comprises a bar graph, pie chart, scatter plot, line graph, column graph, histogram, box and whisker graph, tree map, sunburst graph, waterfall graph, funnel chart, stock graph, surface graph, radar chart, bubble graph, or doughnut graph.

6. The method of claim 1, wherein:
the analyzing the selected data to determine the one or more options comprises determining one or more ranges applicable to the selected data;
the receiving the selection of the option comprises receiving a selection of a range of the one or more ranges; and
the causing presentation of the selected data in place of the image of the placeholder comprises presenting the selected data within the selected range.

7. The method of claim 1, wherein:
the analyzing the selected data to determine the one or more options comprises determining different styles applicable to the selected data;
the receiving the selection of the option comprises receiving a selection of a style option corresponding to one of the styles; and
the causing presentation of the selected data in place of the image of the placeholder data comprises presenting the selected data having a style and format indicated by the selected style option.

8. The method of claim 1, further comprising detecting, from historical data of past copy and paste operations, patterns of options previously selected, wherein the analyzing the selected data to determine the one or more options comprises identifying an option based on the patterns.

9. The method of claim 1, wherein the image of the placeholder comprises a blank table or a table with dummy data.

10. The method of claim 1, wherein:
the analyzing the selected data to determine the one or more options comprises determining a label, based on historical data of past copy and paste operations, applicable to the selected data;
the receiving the selection of the option comprises receiving a selection of the label; and
the causing presentation of the selected data in place of the image of the placeholder comprises presenting the selected data having the selected label.

11. The method of claim 1, wherein:
the analyzing the selected data to determine the one or more options comprises distinguishing between headers, columns, and rows of the selected data, the selected data comprising a table;
the causing presentation of the image of placeholder representing the selected data and the one or more options comprises causing presentation of the table at the second location with delete icons associated with each row and column of the table, a selection of one of the delete icons causing a corresponding row or column to be deleted;
the receiving the selection of the option comprises receiving a selection of a delete icon for one of the rows or columns; and
the causing presentation of the selected data in place of the image of the placeholder comprises maintaining a style and format of the table with a corresponding row or column deleted based on the selection of the delete icon.

12. The method of claim 1, wherein the selected data comprises text regarding a topic and the one or more options comprises images related to the topic.

13. The method of claim 1, wherein the selected data comprises text and one of the one or more options comprises a quote option to place the selected data into a quote format.

14. A system comprising:
one or more hardware processors; and
a memory storing instructions that, when executed by the one or more hardware processors, cause the one or more hardware processors to perform operations comprising:
receiving a selection of data to be copied and an indication to copy the selected data;
copying the selected data, the selected data including content and associated metadata;
receiving an indication to paste the selected data at a second location;
prior to pasting at the second location, analyzing the selected data to determine one or more options available for the paste, each of the options being selectable to change an aspect of the selected data at paste;

prior to pasting at the second location, causing presentation, at the second location, of the one or more options and an image of a placeholder representing the selected data, the image of the placeholder having a similar shape, size, or format as the selected data from the first location, the one or more options being presented relative to the image of the placeholder;

receiving a selection of an option from the one or more options; and in response to receiving the selection of the option, pasting the selected data at the second location by causing presentation of the selected data, formatted according to the selected option, in place of the image of the placeholder.

15. The system of claim 14, wherein:

the analyzing the selected data to determine the one or more options comprises determining one or more visualizations applicable to the selected data;

the causing the one or more options to be presented comprises providing a graphical representation of each of the visualizations applicable to the selected data;

the receiving the selection of the option comprises receiving a selection of a visualization; and the causing presentation of the selected data in place of the image of the placeholder comprises presenting the selected data in a format of the selected visualization.

16. The system of claim 14, wherein:

the analyzing the selected data to determine the one or more options comprises determining one or more ranges applicable to the selected data;

the receiving the selection of the option comprises receiving a selection of a range of the one or more ranges; and the causing presentation of the selected data in place of the image of the placeholder comprises presenting the selected data within the selected range.

17. The system of claim 14, wherein:

the analyzing the selected data to determine the one or more options comprises determining different styles applicable to the selected data;

the receiving the selection of the option comprises receiving a selection of a style option corresponding to one of the styles; and the causing presentation of the selected data in place of the image of the placeholder data comprises presenting the selected data having a style and format indicated by the selected style option.

18. The system of claim 14, wherein the operations further comprise detecting, from historical data of past copy and paste operations, patterns of options previously selected, wherein the analyzing the selected data to determine the one or more options comprises identifying an option based on the patterns.

19. The system of claim 18, wherein the image of the placeholder is visually distinguished to indicate that the image is a placeholder, the visually distinguished image being lighter in color, semi-opaque, or grayed out.

20. A machine-storage medium storing instructions that, when executed by one or more processors of a machine, cause the one or more processors to perform operations comprising:

receiving a selection of data to be copied and an indication to copy the selected data;

copying the selected data, the selected data including content and associated metadata;

receiving an indication to paste the selected data at a second location;

prior to pasting at the second location, analyzing the selected data to determine one or more options available for the paste, each of the options being selectable to change an aspect of the selected data at paste;

prior to pasting at the second location, causing presentation, at the second location, of the one or more options and an image of a placeholder representing the selected data, the image of the placeholder having a similar shape, size, or format as the selected data from the first location, the one or more options being presented relative to the image of the placeholder;

receiving a selection of an option from the one or more options; and in response to receiving the selection of the option, pasting the selected data at the second location by causing presentation of the selected data, formatted according to the selected option, in place of the image of the placeholder.

* * * * *